United States Patent
Zhang et al.

(10) Patent No.: US 11,796,742 B1
(45) Date of Patent: Oct. 24, 2023

(54) PROTECTIVE SEAL ASSEMBLY FOR CONNECTOR MATING INTERFACE

(71) Applicant: Carlisle Interconnect Technologies, Inc., Kent, WA (US)

(72) Inventors: Xiaoxing Zhang, Kent, WA (US); Daniel Bagby, Kent, WA (US)

(73) Assignee: CARLISLE INTERCONNECT TECHNOLOGIES, INC., Kent, WA (US)

( * ) Notice: Subject to any disclaimer, the term of this patent is extended or adjusted under 35 U.S.C. 154(b) by 63 days.

(21) Appl. No.: 17/239,404

(22) Filed: Apr. 23, 2021

Related U.S. Application Data

(60) Provisional application No. 63/015,320, filed on Apr. 24, 2020.

(51) Int. Cl.
  *G02B 6/38* (2006.01)
(52) U.S. Cl.
  CPC ......... *G02B 6/3849* (2013.01); *G02B 6/3854* (2013.01); *G02B 6/3869* (2013.01)
(58) Field of Classification Search
  CPC .................................................. G02B 6/3849
  See application file for complete search history.

(56) References Cited

U.S. PATENT DOCUMENTS

| | | | | |
|---|---|---|---|---|
| 6,554,485 B1 * | 4/2003 | Beatty | ................. | G02B 6/3849 |
| | | | | 385/72 |
| 8,705,931 B2 | 4/2014 | Liu et al. | | |
| 8,998,503 B2 | 4/2015 | Barnei, Jr. et al. | | |
| 9,229,173 B2 | 1/2016 | Yamauchi et al. | | |
| 9,971,100 B2 | 5/2018 | Sparrowhawk et al. | | |
| 2005/0141817 A1 * | 6/2005 | Yazaki | ................. | G02B 6/3825 |
| | | | | 385/78 |
| 2005/0232551 A1 | 10/2005 | Chang et al. | | |
| 2008/0304804 A1 * | 12/2008 | Zimmel | ............... | G02B 6/3849 |
| | | | | 385/139 |
| 2010/0303425 A1 | 12/2010 | Liu | | |
| 2017/0254963 A1 * | 9/2017 | Sparrowhawk | ...... | G02B 6/3866 |
| 2019/0151605 A1 * | 5/2019 | McMenamin | ....... | B65D 43/162 |
| 2020/0257059 A1 * | 8/2020 | Hill | ...................... | G02B 6/4465 |

FOREIGN PATENT DOCUMENTS

| | | | | |
|---|---|---|---|---|
| EP | 2159612 A1 | 3/2010 | | |
| EP | 3098634 A1 * | 11/2016 | .......... | G02B 6/3849 |
| WO | 2015017170 A1 | 2/2015 | | |
| WO | WO-2019005197 A1 * | 1/2019 | ............... | G02B 6/38 |

\* cited by examiner

*Primary Examiner* — Eric Wong
(74) *Attorney, Agent, or Firm* — Stoel Rives LLP

(57) ABSTRACT

A connector, such as a fiber optic connector, including a protective sealant layer bonded to a mating interface of the connector to protect against contaminants and damage to the mating interface prior to use. The sealant layer may comprise a liquid polymer applied to the mating interface using a seal mold to help prevent the polymer from wicking. The liquid polymer may dry at room temperature by solvent evaporation to form a protective barrier covering the mating interface to protect against physical and chemical damage. The protective seal layer also serves to clean the mating interface upon removal of the seal layer to provide for optimal performance of the connector.

20 Claims, 4 Drawing Sheets

PROTECTIVE SEAL ASSEMBLY FOR CONNECTOR MATING INTERFACE

RELATED APPLICATIONS DATA

This application is a nonprovisional of and claims the benefit under 35 U.S.C. § 119(e) of U.S. Provisional Patent Application No. 63/015,320, filed Apr. 24, 2020, the disclosure of which is incorporated by reference herein in its entirety.

TECHNICAL FIELD

The field of this disclosure relates generally to connectors and, in particular, to an assembly designed to protect a mating interface of the connector against contaminants and other damage prior to use, such as during product storage and shipping. The assembly may also clean the mating interface upon removal of the seal to remove particulates or other matter present on the mating interface for improved connector performance.

BACKGROUND

In the field of telecommunication, and signal interconnectivity more generally, fiber optic cables are used to facilitate the transfer of large amounts of data signals at high speeds. To transmit such data signals, fiber optic cables are terminated with fiber optic connectors. Typically, a fiber optic connector includes a ferrule that surrounds and supports an optical fiber to a mating interface of the connector. To ensure proper performance and preserve the integrity of the optical signal while minimizing signal loss or attenuation, the connector mating interface typically undergoes several polishing steps to eliminate any scratches, contaminants, and surface imperfections, as such issues can greatly impact the overall performance of the connector. Contamination along the mating interface is a common cause of failure for fiber optic interconnects.

In some conventional designs, connectors are outfitted with protective end caps or dust covers designed to shield the mating interface during transport, storage, and handling prior to use. While such physical barriers may help minimize post-production contamination or surface scratching of the mating interface, these designs have several disadvantages. For example, while a conventional dust cap may adequately protect the connector interface from physical damage and scratches, it is less effective at protecting against contamination and debris. It is not uncommon that particles from the interior of the dust cap itself may migrate to the mating interface of the connector and create issues when the fiber optic connector is installed. In addition, small passages or gaps may be present along the interface between the connector and the end cap due to tolerance differences between the components. While such passages may be microscopic, they remain sufficiently large to allow the passage of microparticles that may reach and contaminate the mating interface of the connector. Moreover, end users must resort to cleaning the mating interfaces of the connectors after removal of the cap, which may lead to potentially scratching or damaging the interface during the cleaning process. In addition, the act of cleaning itself can create the potential for damage to the mating interfaces if contaminants are abraded across the mating surfaces, which may lead to issues when assemblies are connected in an optical link.

The present inventors have determined a need for an improved protective seal assembly designed for ensuring the integrity of the polished mating interface of an electric connector until the connector is ready for use. The seal assembly is designed to prevent contamination and any surface damage during handling, shipping, and storage. In addition, the protective seal assembly may also be designed to remove any contaminants present on the surface prior to installation of the connectors in the field to optimize performance. Additional aspects and advantages will be apparent from the following detailed description of preferred embodiments, which proceeds with reference to the accompanying drawings.

DETAILED DESCRIPTION OF EXAMPLE EMBODIMENTS

Figure 1:
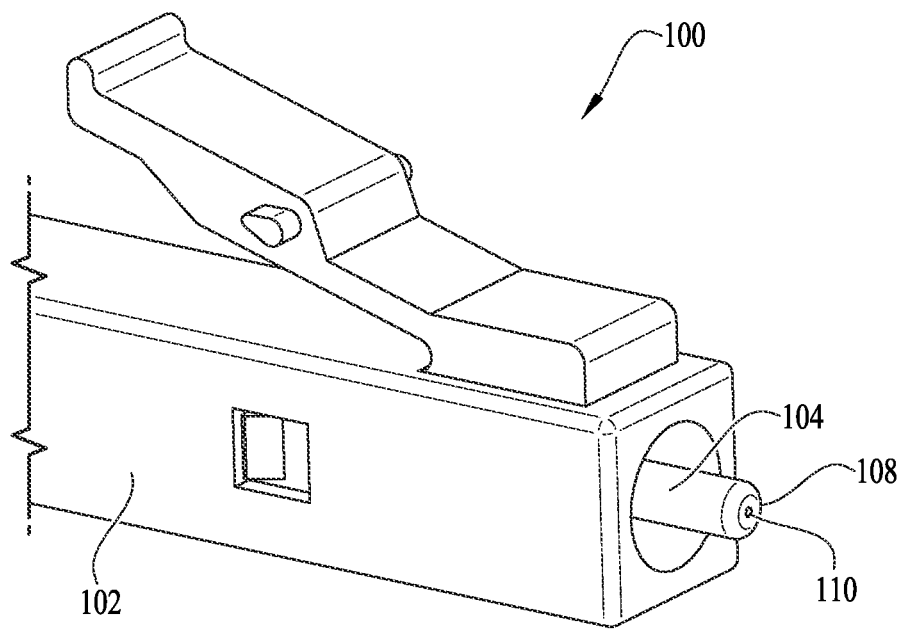
FIG. 1 is an enlarged view of an example fiber optic connector in accordance with one embodiment.

With reference to the drawings, this section describes various embodiments of a protective seal assembly for a connector and its detailed construction and operation. Throughout the specification, reference to "one embodiment," "an embodiment," or "some embodiments" means that a described feature, structure, or characteristic may be included in at least one embodiment of the disclosed subject matter. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

The following describes example embodiments relating to a protective seal assembly for connectors. In the following description, some components of the connector are described in detail, while others are not. It should be understood that in some instances, well-known structures, materials, or operations are not shown or not described in detail to avoid obscuring more pertinent aspects of the embodiments. In addition, although the embodiments may describe a specific type of connector with specific contact types, such as the illustrated fiber optic connector with LC type contacts commonly used in various telecommunication applications, the protective seal assembly and disclosed concepts may be adapted for use with other connector types and contact arrangements used in any suitable industry or for any suitable purpose. Accordingly, it should be understood that the connector design illustrated and described herein is not limited for use with fiber optic connectors. As would be understood by one having skill in the art, the illustrated designs and described methods may be adapted for use with other types of connectors.

With general reference to FIGS. 1-8, the following description relates to a protective seal assembly for connectors. As further described below, the seal assembly is designed to protect the fragile mating interface of the connector from debris and damage during handling, shipping, storage, and installation. In addition, the seal assembly, when removed from the connector prior to use, helps clean the mating interface to remove any contaminants and debris from the mating interface to help ensure optimal connector performance. As further described in detail below, the protective seal assembly incorporates a polymer coating that contacts and protects the delicate mating interface of the connector.

Briefly, to create the coating, a polymer suspension liquid is applied to the mating interface and cured using a specially designed mold. The polymer dries at room temperature by solvent evaporation to form a hardened, physical barrier that serves to protect the mating interface from damage and contaminants. When the connector is ready for use, the barrier is removed, which also removes any contaminants or particulates that were present on the mating interface prior to deposition of the polymer coating to leave a clean interface surface. Additional details and features of the protective seal assembly and method of use are provided below with reference to the figures.

Figure 2:
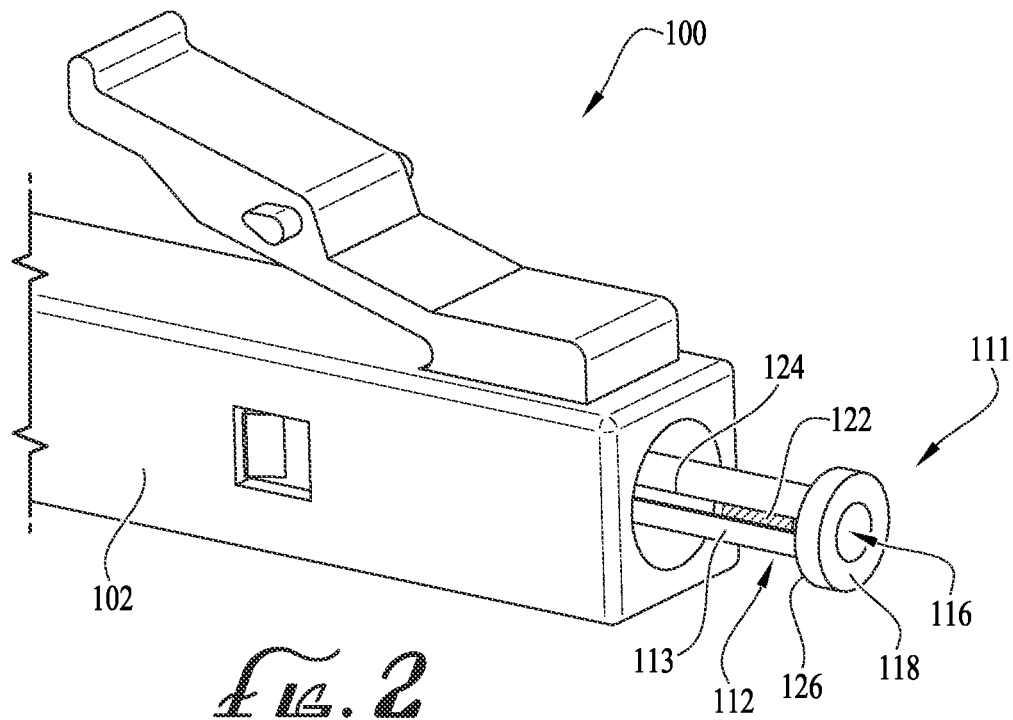
FIG. 2 illustrates the fiber optic connector of FIG. 1 with a protective seal assembly coupled along a mating interface of the connector.
Figure 3:
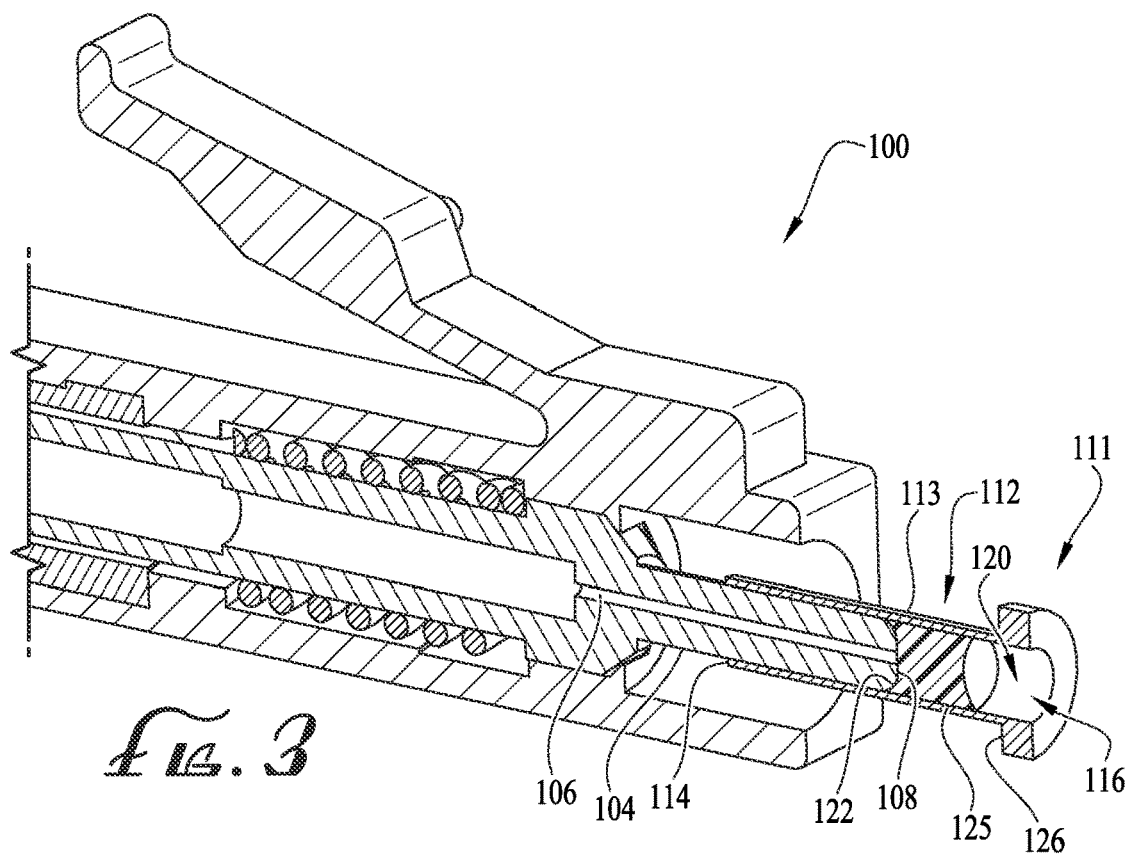
FIG. 3 is a cross-section detail view of the fiber optic connector of FIG. 2 illustrating additional features of the protective seal assembly.

FIG. 1 illustrates an example fiber optic connector 100 in accordance with one embodiment. As noted previously, it should be understood that while the illustrations and description may specifically reference fiber optic connectors, the disclosed subject matter may be adapted for use with other connector types as well. In other words, fiber optic connectors are merely shown and discussed for convenience in relation to the disclosed subject matter and should not be considered limiting. With reference to FIG. 1, the fiber optic connector 100 includes a connector body 102 and a ferrule 104 extending outwardly from an end of the connector body 102. The connector body 102 supports the ferrule 104 and other components (not further described herein to avoid obscuring the pertinent subject matter) of the connector 100. The ferrule 104 may be a metal ferrule, a plastic ferrule, a ceramic ferrule, or made of other suitable materials. As best illustrated in FIG. 3, the ferrule 104 includes a central core 106 designed to house a fiber optic glass (not shown). Returning to FIG. 1, the central core 106 extends along a longitudinal axis of the ferrule 104 and has an opening 110 formed along an end face or mating interface 108 of the connector 100. When the connector 100 is assembled, an optic fiber extends through the central core 106 of the ferrule 104 and to the opening 110 formed along the mating interface 108 of the connector 100. Typically, during manufacture, the mating interface 108 is polished to ensure optimal performance of the connector 100 when the mating interface 108 engages a corresponding connector. With particular reference to FIGS. 2-3, the following describes additional details of the protective seal assembly for protecting the integrity of the mating interface 108 prior to installation.

FIG. 2 illustrates an example embodiment of a protective seal assembly 111 fitted around a portion of the ferrule 104 of connector 100 to protect the mating interface 108, and FIG. 3 is a cross-section detail view illustrating additional details of the seal assembly 111. With collective reference to FIGS. 2-3, the following proceeds with a discussion of the seal assembly 111 and its components, and describes an example method for installing the seal assembly 111 around the connector 100.

With reference to FIGS. 2-3, the seal assembly 111 includes a seal mold 112 having a generally tubular body 113 sized and shaped to fit around the ferrule 104. The seal mold 112 includes a hollow interior cavity (partially obscured from view) within the body 113 and has a first opening (obscured from view) along a first end 114 of the body 113 (see FIG. 3). Both the interior cavity and the opening of the seal mold 112 have a profile designed to closely encircle and surround the ferrule 104 so that the seal mold 112 fits tightly around the ferrule 104 as illustrated in FIG. 2. The seal mold 112 further includes a second opening or port 116 formed on a second end 118 of the body 113 opposite the first opening, where the hollow interior cavity of the body 113 extends from the first opening to the port 116. In some embodiments, the seal mold 112 may include a shoulder 126 formed at the second end 118 to aid a user in gripping and removing the seal mold 112 prior to use of the connector 100. In some embodiments, the shoulder 126 may be larger (e.g., in width or diameter) as compared to the remainder of the body 113 of the seal mold 112 to facilitate gripping. In other embodiments, the body 113 may include any another suitable physical feature, such as a step, a ridge, a tab, or a textured surface, designed to provide an easy gripping surface for removing the mold 112 as needed.

With reference to the cross-section view of FIG. 3, the following provides additional details of the seal mold 112 and describes an example method of how the seal assembly 111 operates to seal against the mating interface 108 of the connector 100. With reference to FIG. 3, to fit the seal mold 112 onto the connector 100, the ferrule 104 is inserted through the opening at the first end 114 of the seal mold 112 and pushed partway into the hollow interior cavity of the body 113. In this configuration, the mating interface 108 of the connector 100 is positioned within the hollow interior cavity of the body 113 and offset from the port 116, forming an open chamber 120 therebetween.

With the seal mold 112 in position around the ferrule 104, a suitable solvent-suspended liquid polymer material (or other suitable material) is introduced into the chamber 120 via the port 116 of the seal mold 112 to form a polymer sealant layer 122. Once deposited, the liquid polymer material coats the entire mating interface 108 and partially or entirely fills the chamber 120 depending on the amount of polymer material used. Preferably, the liquid polymer material only fills a portion of the chamber 120 to minimize material waste while maintaining an appropriately thick polymer sealant layer 122 on the mating interface 108. In such embodiments, the sealant layer 122 is offset from the portion opening 116 by the empty chamber space. In other embodiments, the chamber 120 may be filled to any desired level so long as the mating interface 108 is fully coated.

As illustrated FIG. 2, the body 113 of the seal mold 112 may include one or more longitudinal slit or vents 124 extending from the first end 114 toward the second end 118 of the body 113. In some embodiments, the vent 124 may be offset from the port 116 on the second end 118 to ensure the seal mold 112 retains its structural integrity and to ensure the liquid polymer material is directed toward the mating interface 108. In other embodiments, the vent 124 may extend partway or the entire length of the seal mold 112 from the first end 114 to the second end 118 as desired. The vent 124 is designed to allow the solvent in the liquid polymer material to evaporate away from the polymer and facilitate the curing process of the polymer sealant layer 122. It is noted that depending on the composition of the solvent used, the material for the seal mold 112 should be selected to ensure that the body 113 of the seal mold 112 is resistant to the solvent so that it is not dissolved or otherwise weakened, but instead remains structurally sound throughout the curing process.

Preferably, the liquid polymer material is selected such that it is curable at room temperature by evaporation, but in other embodiments, the polymer can be cured by heating, UV light, or chemical reaction depending on the composition of the selected polymer material. It should be understood that in other embodiments, other venting designs may be used. For example, the vent 124 may instead be formed by a plurality of small openings or holes distributed throughout the body 113, or other suitable designs. Once the polymer has fully cured, the mating interface 108 is fully protected by the polymer sealant layer 122.

Turning to FIG. 3, when the polymer has cured, the polymer sealant layer 122 also bonds with a portion of an interior surface 125 of the seal mold 112. This bond helps ensure that the polymer sealant layer 122 is removed from the mating interface 108 simultaneously with removal of the seal mold 112 when the connector 100 is ready for use. As discussed previously, the polymer sealant layer 122 serves to protect the mating interface 108 from damage, moisture, contaminants, and other debris. Upon removal of the polymer sealant layer 122, the surface materials that may have been present on the mating interface 108 prior to the deposition of the liquid polymer material are encapsulated within the cured polymer sealant layer 122 and are removed together with the polymer sealant layer 122 when the seal mold 112 is detached from the ferrule 104. Once the seal mold 112 and polymer sealant layer 122 have been removed, the connector 100 is ready to use without requiring further cleaning of the mating interface 108 as the polymer sealant layer 122 would have removed all debris and left a clean surface free of any residue.

Figure 4:
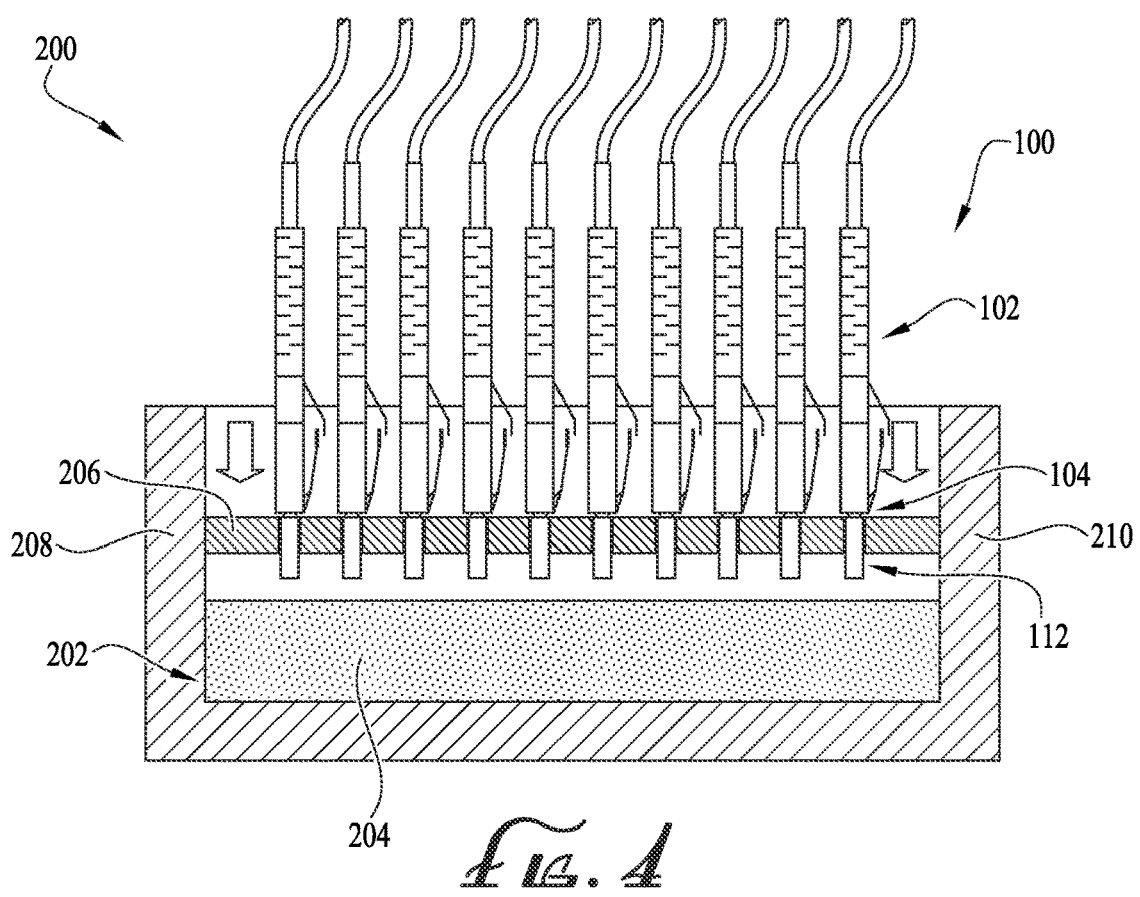
FIG. 4 is a schematic illustration for an example method of applying a polymer seal a set of fiber optic connectors in accordance with one embodiment.

FIG. 4 illustrates one example assembly apparatus 200 operable for mass application of a liquid polymer material to a set of fiber optic connector 100 of FIG. 1 in accordance with one embodiment. With particular reference to FIG. 4, the assembly 200 includes a receptacle 202 having an open top end and a sealed bottom end for containing a volume of liquid polymer 204 therein. The receptacle 202 includes a connector holding fixture 206 spanning across the receptacle 202 from a first wall 208 to a second wall 210, the fixture 206 designed to hold a plurality of connector bodies 102.

Prior to loading the connector bodies 102 onto the fixture 206, the seal molds 112 are pre-assembled onto the connector ferrules 104 as described previously with reference to FIGS. 1-3. Thereafter, the connector bodies 102 are loaded onto the fixture 206 with the ferrules 104 and the seal molds 112 pointed downwardly toward the liquid polymer 204. The fixture 206 is then lowered toward the liquid polymer 204 so that the ferrule 104 and seal mold 112 are dipped into the polymer 204. The polymer 204 enters the seal mold 112 through the port 116 on the seal mold 112 and covers the mating interface 108 of the ferrule 104. Thereafter, the fixture 206 is moved upwardly to lift the ferrule 104 and seal mold 112 out of the polymer 204. The liquid polymer 204 within the seal mold 112 is thereafter allowed to cure to complete the sealing process. If necessary, the dipping process may be performed multiple times to optimize the thickness of the polymer sealant layer.

As is understood in the industry, many fiber optic contacts are terminated to the fiber optic cable prior to being loaded into the connectors they will function in. This is the nature of modular, common-contact-type connectors ubiquitous in the aerospace and defense markets. After termination, these contacts are typically cleaned, inspected and tested before being loaded into the connectors. After loading, they typically are re-cleaned, re-inspected and re-tested before they are ready to be connected for use. In some embodiments, the disclosed concept can be used to eliminate the secondary cleaning, inspection, and testing steps, which will save time, reduce tooling and equipment needs, and facilitate overall installation.

For example, because the protective polymer sealant layer 122 may be applied very thinly and is designed to have intimate contact with the mating interface 108, a terminated contact can be loaded into a connector without having to first remove the protective polymer layer 122 and risk exposing the mating interface 108 to contamination as it passes through the connector body. This is a particular concern with many fiber optic connectors used in the aerospace and defense applications where the connectors have an integrated seal that the contacts pushes through, which exposes the contacts to contamination by mold releases and lubricants present on those seals. As described previously, because the polymer sealant layer 122 can be preserved on the mating interface 108 after application, an operator can simply remove the polymer sealant layer 122 while inside the connector and immediately connect the assembly for use without requiring additional inspection, testing, or cleaning.

In other embodiments, the liquid polymer material may instead be directly applied to each connector. For instance, in one example application method, the liquid polymer material may be stored within a reservoir of an applicator or injection tool (not shown). The applicator or injection tool includes an outlet suitably sized to interact with the port 116 of the seal mold 112. As described earlier, when the seal mold 112 is installed over the ferrule 104 of the connector 100, the port 116 of the seal mold 112 provides a pathway for material deposited therethrough to reach the mating interface 108 of the connector 100 (see FIGS. 2-3). Once the seal mold 112 has been installed, the liquid polymer material is applied through the port 116 and deposited onto the mating interface 108 of the connector 100 and onto the interior surface 125 of the seal mold 112 as described previously. Thereafter, the polymer material is cured to complete the sealing process.

Figure 5:
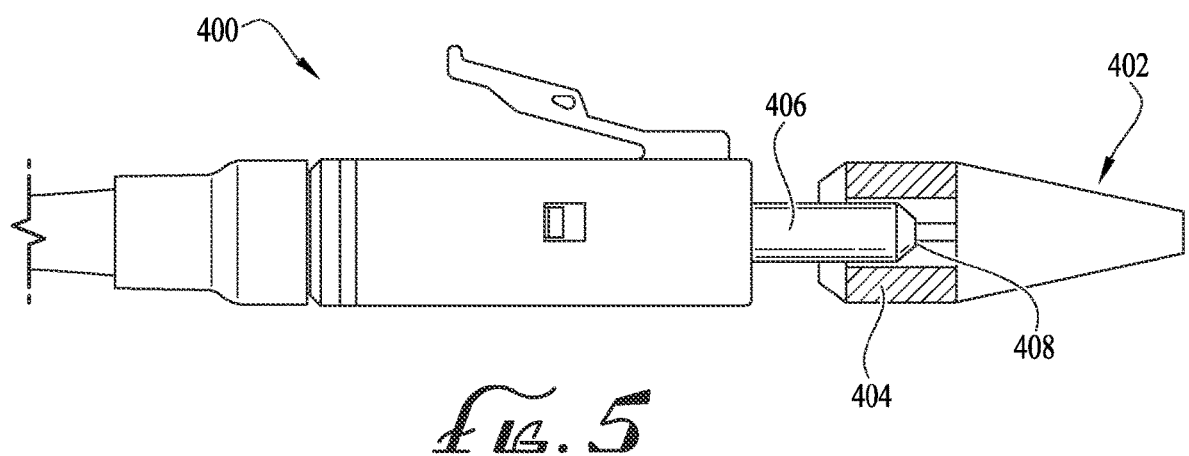
FIG. 5 is a schematic view of the fiber optic connector of FIG. 2 illustrated with heat shrink tubing coupled along the exterior of the protective seal assembly in accordance with one embodiment.

FIG. 5 illustrates a schematic view of another embodiment of a fiber optic connector 400. With reference to FIG. 5, the connector 400 includes similar features as the connector 100 of FIGS. 1-4. Accordingly, those features are not further described herein with the understanding that the same general description applies to the illustrated embodiment of FIG. 4. With reference to FIG. 5, in some embodiments, heat shrink tubing 402 may be positioned around the seal mold 404 that may have similar features as the seal mold 112 described previously. The tubing 402 preferably surrounds the entire seal mold 404 and extend onto a portion of the ferrule 406. Once heat treated, the tubing 402 shrinks and bonds with the seal mold 404 and the ferrule 406 to retain the seal mold 404 in place prior to use. When the fiber optic connector 400 is ready for use, the tubing 402 is peeled away and the seal mold 404 may be removed to expose the mating interface 408 of the connector 400 as described previously. When the tubing 402 is peeled off and broken, it is an indication that the seal assembly has been used and should be discarded.

Figure 6:
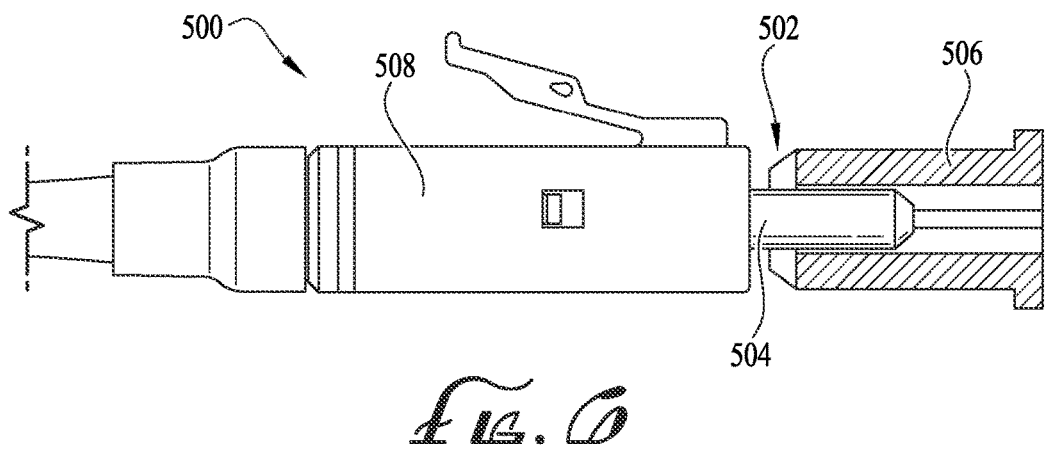
FIG. 6 is a schematic view of the fiber optic connector of FIG. 2 illustrated with heat shrink tubing coupled along an inner end portion of the protective seal assembly in accordance with another embodiment.

FIG. 6 illustrates a schematic view of another embodiment of a fiber optic connector 500. With reference to FIG. 5, the connector 500 uses a similar heat shrink tube or band 502 surrounding the ferrule 504 and seal mold 506 as described with reference to FIG. 5, but the band 502 is deployed over a portion of the ferrule 504 and the seal mold 506 adjacent the connector body 508, but the band 502 does not surround the entirety of the seal mold 506. To remove the seal mold 506, the band 502 may first be broken and removed, and the seal mold 506 may be grasped and pulled in a similar fashion as described previously to expose the mating interface of the connector 500.

Figure 7:
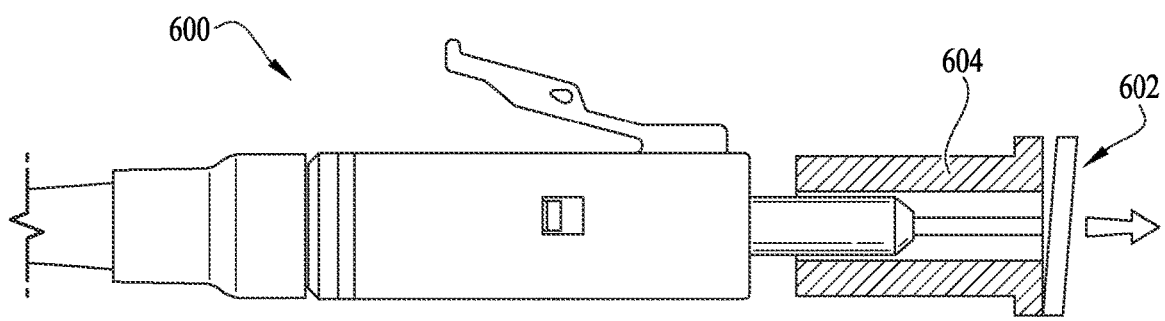
FIG. 7 is a schematic view of the fiber optic connector of FIG. 2 illustrated with a tape tag coupled along an outer end portion of the protective seal assembly to facilitate its removal from the connector in accordance with one embodiment.

FIG. 7 illustrates a schematic view of another embodiment of a fiber optic connector 600. With reference to FIG. 7, the connector 600 includes the same features as the connector 100 of FIGS. 1-4. Accordingly, those features are not further described herein with the understanding that the same description applies to the illustrated embodiment. As illustrated in FIG. 6, the connector 600 incorporates a tape tag 602 adhesively coupled along a suitable portion of the seal mold 604. FIG. 6 illustrates the tape tag 602 covering the port opening (not shown) formed on the end of the seal mold 604 in a similar fashion as previously described. The adhesive tape tag 602 facilitates removal of the seal mold 604 when the connector 600 is ready for use. Pulling on the tap tag 602 in turn pulls on the seal mold 604 to dislodge it from the connector 600. In this embodiment, the mold assembly is designed for one time use with a disposable design. Removal of the tape indicates that the mold assembly has been used and should be discarded.

Figure 8:
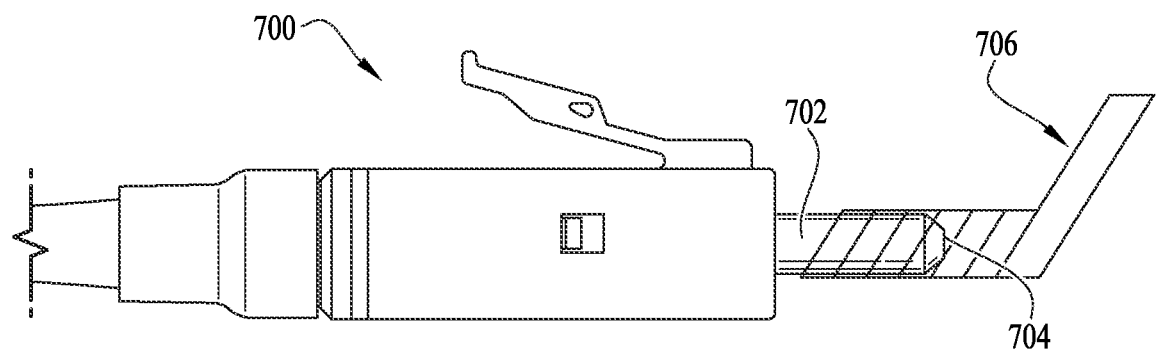
FIG. 8 is a schematic view of the fiber optic connector of FIG. 1 illustrated with a tape seal coupled to the mating interface and protective seal in accordance with another embodiment.

FIG. 8 illustrates a schematic view of yet another embodiment of a fiber optic connector 700. With reference to FIG. 8, the connector 700 includes a ferrule 702 having a mating interface 704 arranged in a similar fashion as described previously. The connector 700 further includes an adhesive tape barrel assembly 706 wrapped around the ferrule 702. In this arrangement, the liquid polymer material is then injected along the front of the tape barrel assembly 706, with the polymer contacting the ferrule 704 and coating the ferrule 704 in a similar fashion as described previously. As designed, the tape barrel assembly 706 protects the mating interface 704 from inadvertent scratching and limits potential contaminants from interacting with the mating interface 704. When the connector 700 is ready for use, the tape barrel assembly 706 may be removed to leave a clean mating interface 704 free of any adhesive residue.

As described, the disclosed subject matter provides details for a protective seal assembly designed to minimize the intrusion of debris or surface contaminants for the mating interface of a connector interface, while also protecting the surface from scratching or physical damage. In addition, when the seal assembly is removed, any surface contaminants are also removed to provide a clean surface when the connector is ready for use. Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable. The terms and descriptions used above are set forth by way of illustration only and are not meant as limitations. It will be obvious to those having skill in the art that many changes may be made to the details of the above-described embodiments without departing from the underlying principles of the invention. Those having skill in the art should understand that other embodiments than those described herein are possible.

The invention claimed is:

1. A connector comprising:
a connector body;
a ferrule extending outwardly from the connector body, the ferrule including a mating interface on an end thereof for engaging a corresponding connector;
a seal mold including a longitudinal body portion and a cap portion extending from the longitudinal body portion, the longitudinal body portion including a first opening formed along a first end of the seal mold and the cap portion including a port opening formed along a second end of the seal mold, the seal mold further including a hollow interior cavity extending between the first end and the second end, wherein the ferrule extends through the first opening on the first end of the seal mold and the mating interface of the ferrule is positioned within the hollow interior cavity of the seal mold;
one or more vents formed along the longitudinal body portion of the seal mold; and
a sealant layer disposed within the hollow interior cavity of the body of the seal mold, the sealant layer contacting and overlaying the mating interface of the ferrule.

2. The connector of claim 1, wherein the sealant layer comprises a curable polymer material, and wherein the one or more vents of the longitudinal body portion expose the sealant layer within the hollow interior cavity of the seal mold to an exterior of the seal mold to facilitate a curing process of the polymer material.

3. The connector of claim 2, wherein the polymer material is curable at room temperature.

4. The connector of claim 1, wherein at least a portion of the sealant layer is bonded to an interior surface of the longitudinal body portion of the seal mold, and wherein removal of the seal mold from the ferrule concurrently removes the sealant layer from the mating interface of the ferrule.

5. The connector of claim 4, wherein a bond strength of the sealant layer and the mating interface is less than a corresponding bond strength of the sealant layer and the interior surface of the longitudinal body portion of the seal mold, such that upon removal of the seal mold from the ferrule, the mating interface is free of debris and residue from the sealant layer.

6. The connector of claim 1, wherein the port opening is in communication with a chamber of the interior cavity of the longitudinal body portion formed between the mating interface of the ferrule and the second end of the seal mold.

7. The connector of claim 6, wherein the sealant layer on the mating interface of the ferrule is disposed within the chamber, the sealant layer bonded to an interior surface of the longitudinal body portion of the seal mold.

8. The connector of claim 1, wherein the connector is a fiber optic connector, and wherein the ferrule further includes a core passageway extending along a transverse axis thereof, the mating interface of the ferrule further including an opening in communication with the core passageway, and wherein the core passageway houses an optical fiber.

9. The connector of claim 1, further comprising heat shrink tubing surrounding at least a portion of the longitudinal body portion of the seal mold and the ferrule, the heat shrink tubing bonded to the ferrule and an exterior surface of the seal mold.

10. The connector of claim 1, further comprising an adhesive cover bonded to an exterior surface of the longitudinal body portion of the seal mold, the adhesive cover operable to urge removal of the seal mold from the ferrule in response to an application of force on the adhesive cover.

11. The connector of claim 8, wherein the sealant layer further overlays the opening on the mating interface of the ferrule.

12. A method of assembling a connector, the connector including a ferrule extending outwardly from a connector body, the ferrule including a mating interface on an end thereof for engaging a corresponding connector, the method comprising:
polishing the mating interface of the ferrule of the connector;
inserting the ferrule through a first opening on a longitudinal body portion of a seal mold, the longitudinal body portion including a hollow interior cavity, wherein the mating interface of the ferrule is positioned within the hollow interior cavity and is offset from a port opening formed on a cap portion extending from the longitudinal body portion of the seal mold;
applying a liquid polymer onto the mating interface of the ferrule through the port opening of the cap portion of the seal mold, the liquid polymer coating the mating interface of the ferrule; and
curing the liquid polymer to form a protective sealant layer covering the mating interface of the ferrule within the seal mold.

13. The method of claim 12, the longitudinal body portion of the seal mold further including one or more vents thereon, and wherein the liquid polymer is a solvent-suspended liquid polymer, the method further comprising evaporating the solvent in the solvent-suspended liquid polymer via the one or more vents on the longitudinal body portion of the seal mold to cure the liquid polymer.

14. The method of claim 13, wherein the step of curing the liquid polymer occurs at room temperature.

15. The method of claim 12, wherein the liquid polymer coats the mating interface such that no air gaps are present between the mating interface and the sealant layer.

16. The method of claim 12, wherein the applying step further includes dipping the connector body and seal mold into a container of the liquid polymer to direct the liquid polymer onto the mating interface through the port opening on the cap portion of the seal mold.

17. The method of claim 12, wherein the applying step further includes injecting liquid polymer onto the mating interface through the port opening of the cap portion of the seal mold.

18. The method of claim 12, wherein the liquid polymer further coats an interior surface of the longitudinal body portion of the seal mold, and wherein removal of the seal mold from the ferrule concurrently removes the sealant layer from the mating interface of the ferrule.

19. The method of claim 12, further comprising:
applying heat shrink material onto an exterior surface of at least a portion of the longitudinal body portion of the seal mold and the ferrule; and
bonding the heat shrink material to the seal mold and the ferrule.

20. The method of claim 12, further comprising applying an adhesive cover to the longitudinal body portion of the seal mold, the adhesive cover operable to urge removal of the seal mold from the ferrule in response to an application of force on the adhesive cover.

* * * * *